(12) United States Patent
Reber et al.

(10) Patent No.: US 8,191,434 B2
(45) Date of Patent: Jun. 5, 2012

(54) DEVICE AND METHOD FOR TEMPERATURE COMPENSATION TESTING OF DIGITAL LOAD CELLS

(75) Inventors: Daniel Reber, Madetswil (CH); Urs Loher, Widen (CH); Aaron Skidmore, Columbus, OH (US)

(73) Assignee: Mettler-Toledo, LLC, Columbus, OH (US)

( * ) Notice: Subject to any disclaimer, the term of this patent is extended or adjusted under 35 U.S.C. 154(b) by 342 days.

(21) Appl. No.: 12/418,078

(22) Filed: Apr. 3, 2009

(65) Prior Publication Data
US 2010/0251833 A1    Oct. 7, 2010

(51) Int. Cl.
*G01L 1/04*    (2006.01)
(52) U.S. Cl. .................................. 73/862.623
(58) Field of Classification Search .............. 73/862.623
See application file for complete search history.

(56) References Cited

U.S. PATENT DOCUMENTS

| | | | |
|---|---|---|---|
| 2,706,396 A | 4/1955 | Harland | |
| 4,543,837 A | 10/1985 | Stern et al. | |
| 4,815,547 A | 3/1989 | Dillon et al. | |
| 4,875,369 A * | 10/1989 | Delatorre | 73/152.52 |
| 5,307,683 A | 5/1994 | Phelps et al. | |
| 5,337,446 A * | 8/1994 | Smith et al. | 15/21.1 |
| 5,801,337 A | 9/1998 | Peake | |
| 5,841,077 A * | 11/1998 | Kolaci | 177/210 R |
| 6,173,619 B1 | 1/2001 | Satake et al. | |
| 6,494,343 B2 * | 12/2002 | McManus et al. | 222/55 |
| 6,568,266 B1 * | 5/2003 | Desa et al. | 73/431 |
| 6,848,292 B2 * | 2/2005 | Joseph et al. | 73/1.57 |
| 7,171,851 B2 * | 2/2007 | Kamata | 73/152.59 |

FOREIGN PATENT DOCUMENTS

| | | |
|---|---|---|
| JP | 2008-190893 A | 8/2008 |
| WO | 03/081198 A1 | 10/2003 |

* cited by examiner

*Primary Examiner* — Lisa Caputo
*Assistant Examiner* — Octavia Davis-Hollington
(74) *Attorney, Agent, or Firm* — Standley Law Group LLP (57) ABSTRACT

A device and method for effectuating the temperature compensation testing of digital load cells. The device uses conductive heat transfer to establish and maintain the temperature of the load cell(s) during testing. The device may include a vessel into which one or more load cells to be tested are placed. Temperature control of the load cells may be accomplished by circulating a temperature controlled fluid through the vessel. The vessel containing the one or more load cells may then be placed in a load application device that applies a load(s) to the one or more load cells during testing. Readings from the one or more load cells are used to establish a temperature compensation factor for each load cell tested. In other embodiments, temperature control of the load cells may be accomplished by placing the load cells in contact with a solid heat transfer element(s).

22 Claims, 8 Drawing Sheets

DEVICE AND METHOD FOR TEMPERATURE COMPENSATION TESTING OF DIGITAL LOAD CELLS

BACKGROUND OF THE INVENTIVE FIELD

The present invention is directed to device and method for establishing temperature compensation factors for digital load cells. More particularly, the present invention is directed to a device and method for establishing temperature compensation factors across the full span of digital load cells during the manufacture thereof.

A digital load cell, as the term is used herein, may generally include a column or other load-bearing element designed to support a load to be weighed, one or more strain gauges associated with the load-bearing element and provided to generate a signal(s) representative of the load on the load-bearing element, an analog-to-digital (A/D) converter for converting analog output signals of the strain gauges to digital signals, and a microprocessor and associated circuitry for interacting with the A/D converter for processing and transmitting the digital signals. Such a load cell may also include memory for storing various correction coefficients, etc. A thorough description of one such embodiment of a digital load cell is presented in U.S. Pat. No. 4,815,547 to Benny N. Dillon et al. As explained therein, when the load-bearing element of such a load cell is a column, the column may be, but is not required to be, designed as a self-erecting rocker pin.

In the course of digital load cell production, it is desirable to establish a consistent output from each load cell. Determining this output requires the calculation of a number of different performance characteristics that will change from load cell to load cell based on material and manufacturing variations therebetween. Therefore, the output of such load cells must typically be altered (compensated) to account for such variations.

Digitally compensated load cells need to be thermally stabilized and tested at various temperatures in order to identify the performance characteristics and establish the appropriate compensation factors at each of those temperatures. This is typically accomplished by connecting a load cell of interest to a measurement instrument, raising the temperature of the load cell to a stable temperature, and then taking the measurement(s).

The most common method for providing the range of temperatures necessary for the aforementioned testing process involves placing a load cell of interest into a temperature compensation chamber that uses typical HVAC components to convectively generate and maintain various desired testing temperatures therein. Unfortunately, there are a number of disadvantages to the use of such a device and method. For example, known temperature compensation chambers tend to be large in size due to the fact that a chamber must house a load application device (for performing temperature compensation at points other than zero load) in addition to the load cell being tested. As a result of their large size, a significant amount of time is often required for known temperature compensation chambers to reach an initial load cell thermal stabilization temperature and/or to cycle through additionally elevated load cell thermal stabilization temperatures. As such, a considerable amount of energy is also generally required to operate such a temperature compensation chamber.

A device and method of the present invention improves the efficiency of the temperature compensation process described above. A device and method of the present invention overcomes the aforementioned drawbacks associated with known devices and methods for effecting digital load cell temperature compensation.

SUMMARY OF THE GENERAL INVENTIVE CONCEPT

A device and method of the present invention allows for the temperature compensation of a digital load cell using conductive, rather than convective, heat transfer. As a result, a device and method of the present invention is able to quickly establish and stabilize the temperature of a load cell at one or more desired levels during the temperature compensation stage of the load cell production process.

In one exemplary embodiment of the present invention, a load cell(s) is placed in a vessel and the vessel is subsequently flooded with a liquid of pre-established temperature that is stored and controlled external to the vessel. Alternatively, the vessel could be equipped with a temperature control device to change the temperature of fluid contained therein. In any event, use of such a vessel preferably allows the entire vessel containing the load cells to be introduced to a load application device that may be maintained at ambient temperature—as opposed to requiring that the load application device be housed within the vessel. The load application device may then apply any load between zero and full span to the load cell(s) while the load cell(s) is held at a desired temperature within the vessel.

In an alternate exemplary embodiment of the present invention, conductive heat transfer is accomplished by placing a load cell(s) in contact with a substantially solid heat transfer element that may be heated or cooled through any number of conventional methods. For example, such heat a transfer element may include a heat pipe, a Peltier element, or a device through which a temperature adjustable fluid is passed. Conductive heat transfer from the substantially solid heat transfer element to a load cell(s) is used to adjust and maintain the load cell temperature.

Other embodiments, such as a combination of the aforementioned exemplary embodiments are also possible. In all cases, however, devices and methods of the present invention may be used to produce fully compensated load cells that are manufactured under reduced temperature compensation cycle times and energy requirements.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

As described above, a device and method of the present invention makes use of conductive, rather than convective, heat transfer to establish and maintain the temperature of one or more load cells to be compensated. In one exemplary embodiment of the present invention, one or more load cells are placed into a vessel that is subsequently filled with fluid that is circulated through the vessel and surrounds and contacts the load cells. The temperature of the fluid may be controlled by a device external to the vessel or, alternatively, the vessel may include an appropriate temperature control device. In either case, the entire vessel may preferably then be introduced to a load application device so that the load cell(s) within the vessel may be compensated for temperature variations at various loads (e.g., 0%, 25%, 50%, 75%, 100% of rated load capacity). Such a device may be designed to house one or a number of load cells.

Figure 1:
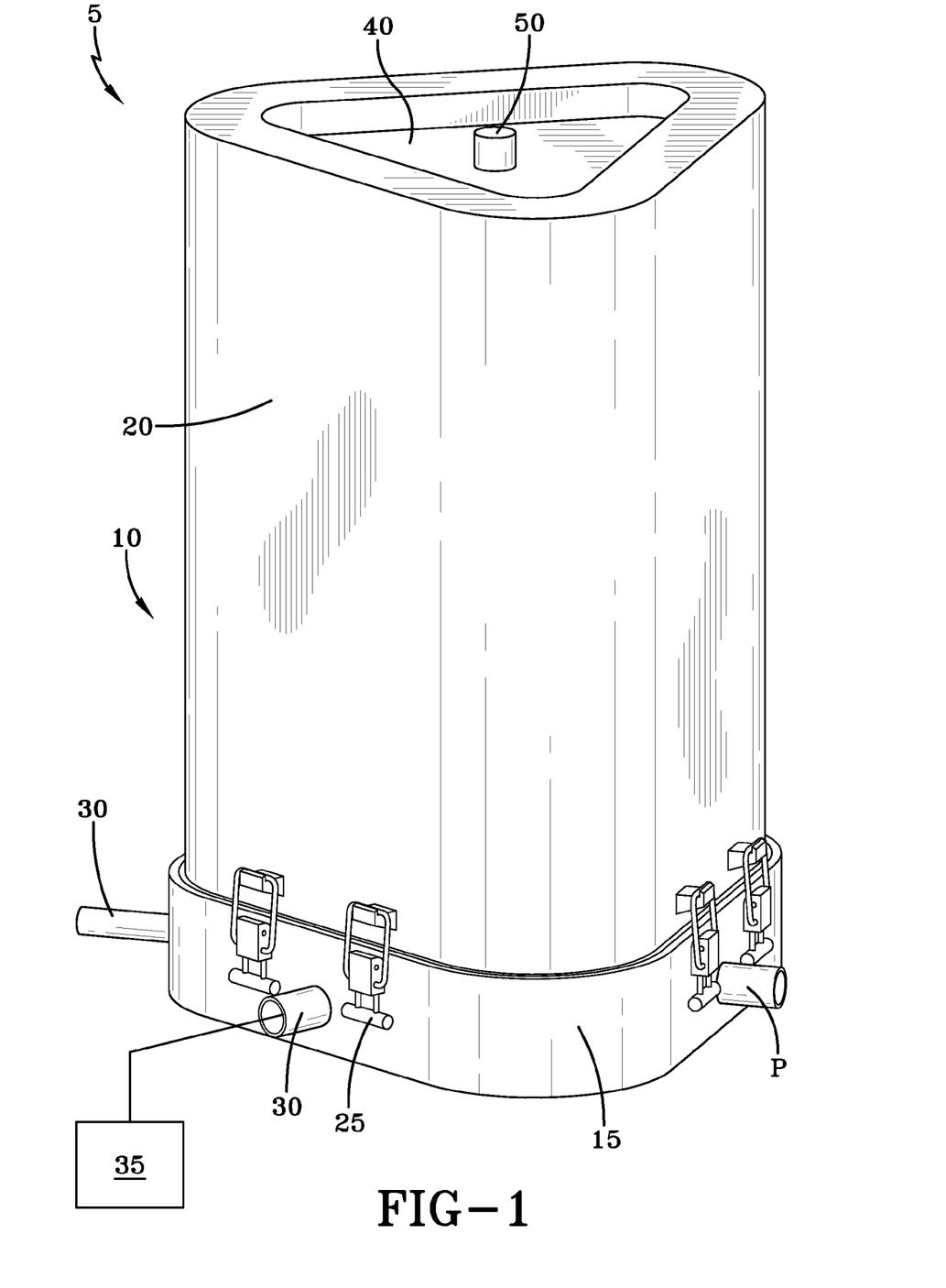
FIG. 1 illustrates one exemplary embodiment of heat transfer fluid-employing temperature compensation testing device of the present invention in an assembled state.
Figure 2:
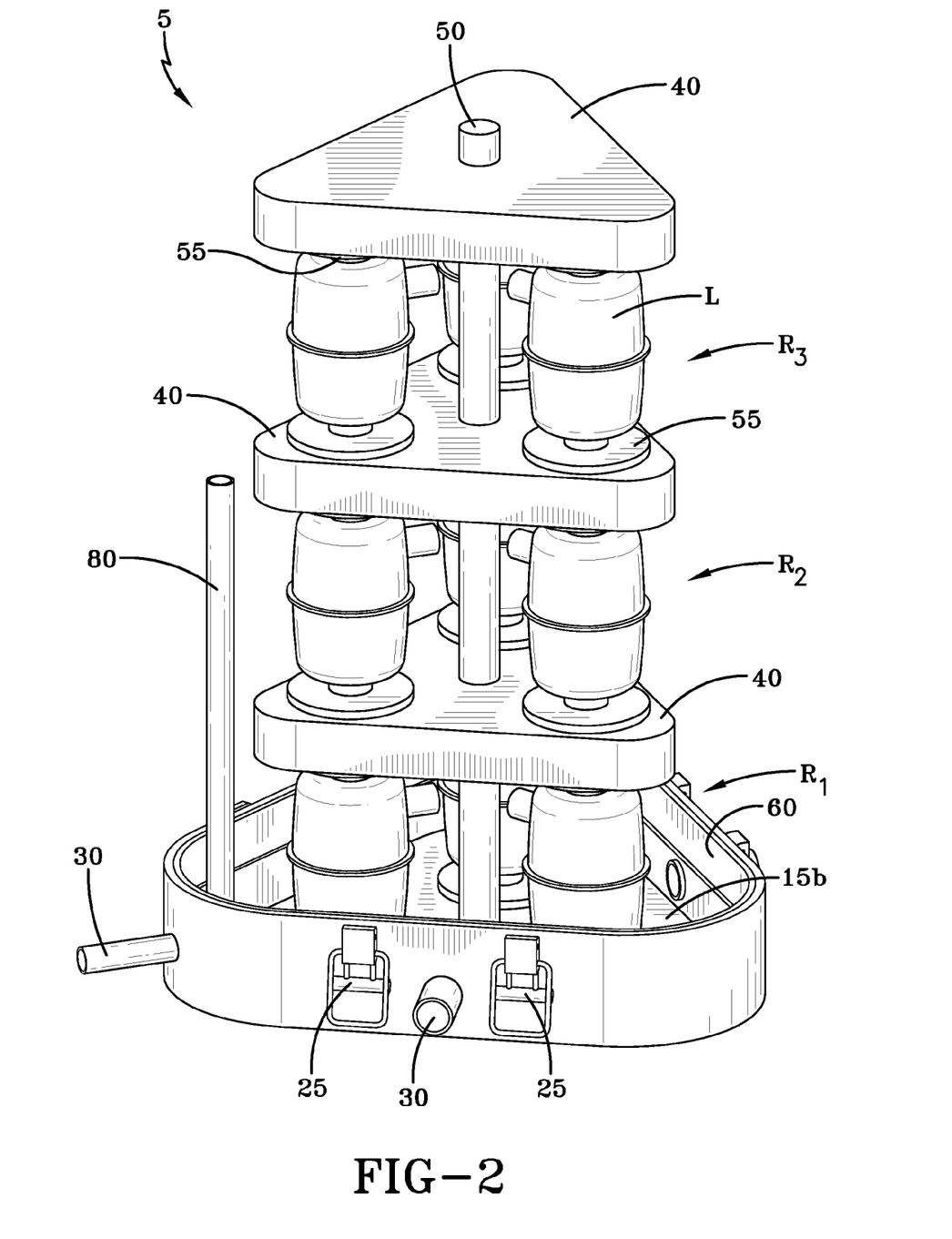
FIG. 2 shows the device of FIG. 1 with a cover removed such that a number of load cells to be compensated are revealed.

One exemplary temperature compensation testing device of the present invention is illustrated in FIGS. 1-2. As can be observed in FIG. 1, when assembled, this exemplary temperature compensation testing device 5 includes a vessel 10 having a base portion 15 and a cover portion 20. As shown, the cover portion 20 is designed to fit into the base portion 15. In other embodiments, the base portion 15 may fit into the cover portion 20.

In any case, the base portion and the cover portion 20 are preferably placed into sealing contact. To facilitate such sealing contact, this particular vessel 10 is provided with a seal 60 (see FIG. 2) around an interior perimeter of the base portion 15 and a number of latch mechanisms 25 that are adapted to draw the cover portion 20 tightly against the base portion 10. As would be understood by one skilled in the art, a number of other general vessel designs and techniques for establishing and maintaining sealing contact between vessel components may also be employed.

A number of fluid ports 30 are also shown in FIG. 1. These fluid ports 30 may allow a fluid (e.g., water, oil) from a separate source to be circulated through the vessel 10. For example, the fluid ports 30 may be connected to a temperature control device 35 that controls the temperature of the fluid. The temperature control device 35 may itself pressurize the fluid for supply to the temperature compensation testing device 5. Alternatively, the temperature control device 35 may be associated with a separate source of pressurized fluid. As described below, other embodiments of the present invention may locate the fluid entirely within the vessel. In any case, a number of such temperature control devices and similar apparatus would be known to one of skill in the art and, as such, no further detail in regard thereto need be provided herein.

Referring now to FIG. 2, the vessel 10 is shown with the cover portion 20 thereof removed such that an interior structure of the exemplary temperature compensation testing device 5 can be observed. As can be seen, this particular temperature compensation testing device 5 is designed to house and compensate nine digital load cells L simultaneously. As would be realized by one of skill in the art, however, other embodiments of a temperature compensation testing device of the present invention may be designed to house and compensate a different number of load cells, including only a single load cell.

In the exemplary temperature compensation testing device 5 of FIGS. 1-2, the nine load cells L are arranged in three rows of three load cells each. A first row $R_1$ of load cells L is supported on a bottom wall 15b within the base portion 15, or on a structure in communication with the bottom wall of the base portion. The second and third rows $R_2$, $R_3$ are stacked atop the first row $R_1$, with each row separated by a load cell support/load transfer plate (hereinafter "support plate") 40. A support/load transfer member (hereinafter "support member") 50 extends upward from the bottom wall 15b, or a structure in communication with the bottom wall, of the base portion 10. The support member 50 passes through each of the support plates 40, preferably along a central axis thereof. Preferably, each support plate 40 is provided with an aperture 45 of sufficient size to permit uninhibited passage of the support member 50. Although the support member 50 and the associated apertures 45 in the support plates 40 are shown to be of circular cross-section in this exemplary embodiment, it is to be understood that other cross-sectional shapes are also possible. For example, employing a non-circular cross-section may facilitate proper alignment of the support plates 40.

As shown in FIG. 2, each support plate 40 in this exemplary embodiment is substantially triangular in shape and of some thickness. Due to the particular design shown, wherein load cells L to be compensated are arranged in rows of three, support plates 40 of substantially triangular shape allow for a temperature compensation testing device 5 of minimal size. As would be apparent, support plates of other shapes and/or support plates designed for other load cell arrangements may be used in other embodiments of the present invention.

Whatever the shape, the support plates are preferably manufactured from a material of sufficient strength and are of a sufficient thickness so as to minimize or prevent deformation thereof when the load cells L are subjected to loading (as described in more detail below). Preferably, but not necessarily, the support plates and other components of a temperature compensation testing device 5 of the present invention are manufactured from a material that is, or is treated so as to be, impervious or resistant to any negative effects (e.g., corrosion, oxidation) associated with contact by the fluid circulated through the vessel.

Because the particular load cells L shown in this exemplary embodiment are of a rocker pin design (as would be understood by one skilled in the art), each support plate 40 is provided with at least one set of load cell receivers 55 (which may also be load cell receiving cavities in the support plates and/or base portion) that are designed to receive and releasably retain one end of a load cell rocker pin. In this particular temperature compensation testing device 5, a set of three load cell receivers 55 is located on the load cell support wall 15b of the base portion 15 and on the underside of the uppermost support plate 40 that resides atop the load cells L of the third row $R_3$. The support plates 40 that reside on either side of the second row $R_2$ are provided with a set of three load cell receivers 55 on both sides thereof. Consequently, when the temperature compensation testing device 5 is assembled, the load cells L are held in place between the support plates 40 by the load cell receivers 55.

As can be observed in both FIGS. 1 and 2, a number of fluid ports 30 are present in the base portion 15. Different numbers of fluid ports may be present on different temperature compensation testing device embodiments of the present invention, said number depending on, for example, the size and shape of the associated vessel and the number of load cells housed therein. Although fluid ports are only shown in the base portion 15 of this embodiment of the temperature compensation testing device 5, it is certainly possible to place such ports in the cover portion 20 instead of, or in conjunction with, locating ports only in the base portion. It is noted, however, that fluid supplied to the vessel 10 via the temperature control device 35 will generally be of elevated temperature and, as warmer fluid will tend to rise within the vessel, it may be preferable to introduce the fluid at the base portion 15 so as to provide a more uniform fluid temperature within the vessel.

As further illustrated in FIG. 2, one or more conduits 80 may be connected to one or more of the fluid ports 30 and extend into the vessel 10. In operation, such conduits 80 may function to supply/return fluid to/from the interior of the vessel 10.

As can be best observed in FIG. 1 the uppermost support plate 40 is exposed through the cover portion 20 of the vessel 10 when the temperature compensation testing device 5 is assembled. As is described in more detail below, this allows an engaging element of a load application device (see FIG. 3) to apply a load to the load cells L during temperature compensation testing. A seal (not shown) such as the base portion seal 60 shown in FIG. 2 may be affixed to the interior wall of the cover portion 20 and/or to the exterior perimeter of the uppermost support plate 40 to help ensure an adequate seal therebetween. The use of other sealing techniques, such as the use of 0-rings and other sealing mechanisms known to those skilled in the at could also be employed for this purpose.

In other embodiments (not shown), the top surface of the cover portion 20 may include one or more apertures of a size that permits only portions of the uppermost support plate 40 to be exposed therethrough. The apertures may be dimensioned and located to receive corresponding elements of a load application device during the load cell compensation process. The aperture(s) may be sealed against leakage with an o-ring or by any other technique known in the art.

By further reference to FIG. 2, it can be understood that when the load cell support structure is in a disassembled state, only the base portion 15 (and its associated load cell receivers 55) and the upwardly extending support member 50 are present (although the upwardly extending support member may also be a separately installable element). Therefore, to prepare a group of load cells L for temperature compensation testing using the exemplary device 5, one end of each of the first row $R_1$ of load cells L is typically placed on a load cell receiver 55 associated with the base portion support wall 15b. With the load cells L maintained in an upright position (such as with assistance), the first of the three support plates 40 is passed over the support member 50 and slid downward to rest atop the load cells so that a load cell receiver on the underside of the support plate engages the upper rocker pin end of a corresponding one of the first row of load cells. This process is repeated for the second and third rows $R_2$, $R_3$ of load cells L, such that the structure shown in FIG. 2 is produced.

With the load cell/support plate structure completed, the cover portion 20 may be assembled to the base portion 15, thus ensuring that the position of the load cells is maintained. The assembled vessel 10 may then be connected to a source of pressurized and temperature controlled fluid, such as described above. Fluid connection(s) may be accomplished before or after the temperature compensation testing device 5 is installed to a load application device.

Figure 3:
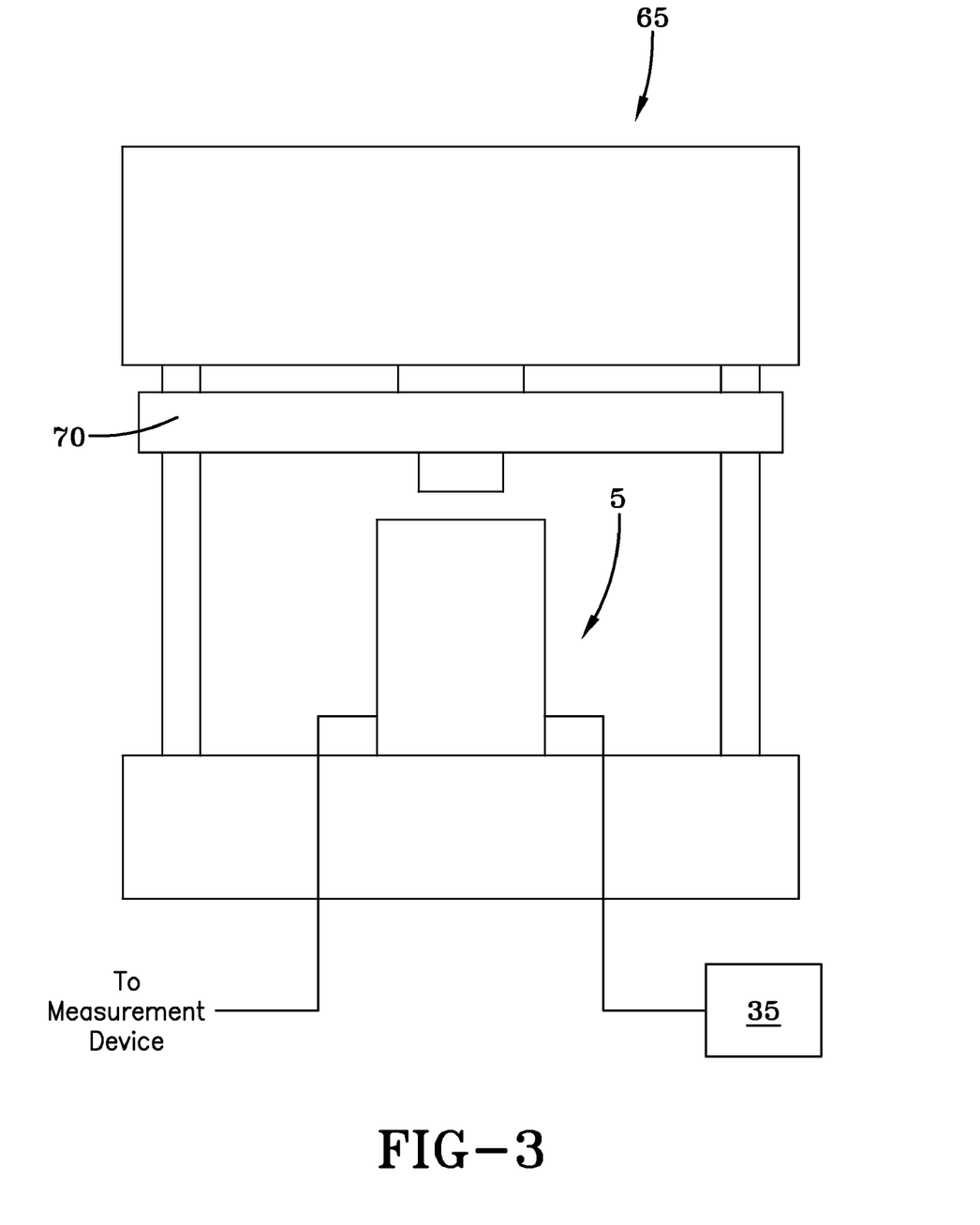
FIG. 3 depicts the device of FIG. 1 located in a load application device for the purpose of applying a load to the load cells during temperature compensation thereof.

The assembled temperature compensation testing device 5 of FIG. 1 is schematically shown installed to a load application device 65 in FIG. 3. This exemplary load application device 65 is basically a press having a moving platen 70 adapted to engage the uppermost support plate 40 of the temperature compensation testing device 5 and to apply a load to the load cells by exerting a force against said uppermost support plate. Whatever the orientation of the temperature compensation testing device 5 and the load application device 65, the resulting load applied to the load cells L is directed along the proper force-receiving axes thereof.

As can be understood by reference to FIG. 2, any force exerted by the load application device 65 on the uppermost support plate 40 will be transferred to the load cells L of each subjacent row via the remaining interposed support plates. Preferably, the pressing force of the load application device 65 can be adjusted so as to facilitate temperature compensation testing of the load cells L at various loading levels.

During the temperature compensation testing process, readings from each of the load cells L are received and recorded at various levels of loading. For example, readings may be recorded at 0%, 25%, 50%, 75% and 100% of the rated maximum load of the load cells. Of course, load cell readings may be received and recorded at a number of other loading levels instead of, or in addition to, the stated exemplary loading levels. As would be understood by one skilled in the art, the readings from the load cells are used to determine a temperature compensation constant for each tested load cell.

In order to facilitate communication to/from the load cells during the temperature compensation testing process, one or more connectors or ports P may be provided in the base portion 15 and/or the cover portion 20. For example, and as shown in this particular embodiment, a single port may be provided to serve all three rows $R_1$, $R_2$, $R_3$ of load cells L. Alternatively, a separate port may be provided for each of the three rows $R_1$, $R_2$, $R_3$ of load cells L. When a port is provided, a seal may also be included to ensure fluid tight passage of any wiring through the base portion 15 or cover portion 20. Alternatively, a sealed connecter may be provided in the base portion 15 and/or cover portion 20 such that one or more load cells L may be connected to one side of the connecter(s) and a host computer or other device connected to an opposite side of the connector(s).

The port(s) P or connectors allows for connection of some or all of the load cells L to a host computer or other microprocessor-based device during the temperature compensation testing process. The load cells may be connected to the host computer or other device via a communication bus or by any of other various techniques that would be known to one skilled in the art.

While wired communication between the load cells L and a host computer or other microprocessor-based device is illustrated in the drawing figures, it is to be understood that such communication may also be accomplished wirelessly. For example, the load cells may be connected to a wireless transmitter or transceiver device located within the vessel. Readings from the load cells L may then be wirelessly transmitted to a corresponding receiver or transceiver associated with a host computer or other microprocessor-based device, eliminating the need for a communication port through the vessel. Consequently, it is to be understood that any reference to an electronic communication path through said vessel may include a wireless communication path.

In this particular embodiment, communication between the load cells and the host computer is simplified by designating one of the load cells L in each of the rows $R_1$, $R_2$, $R_3$ of load cells as a reference load cell that communicates to the host computer the load reading on all the load cells of a given row. That is, since the load on all the load cells of a given row of load cells should be the same, communication of the load from a single load cell in each row is sufficient. In other embodiments, the load on each load cell may be reported individually.

Figure 4:
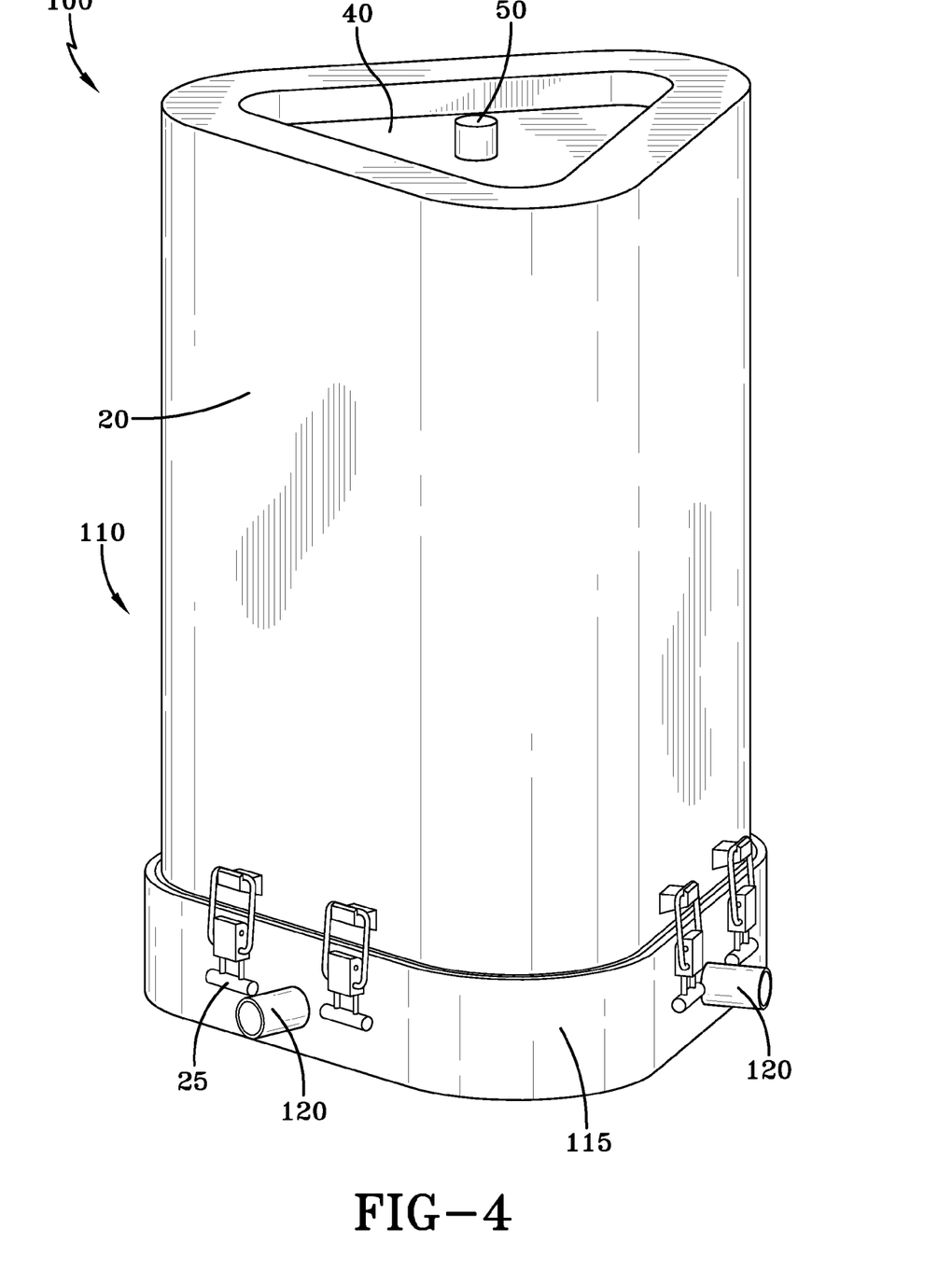
FIG. 4 illustrates an alternate embodiment of a heat transfer fluid-employing temperature compensation testing device of the present invention in an assembled state.
Figure 5:
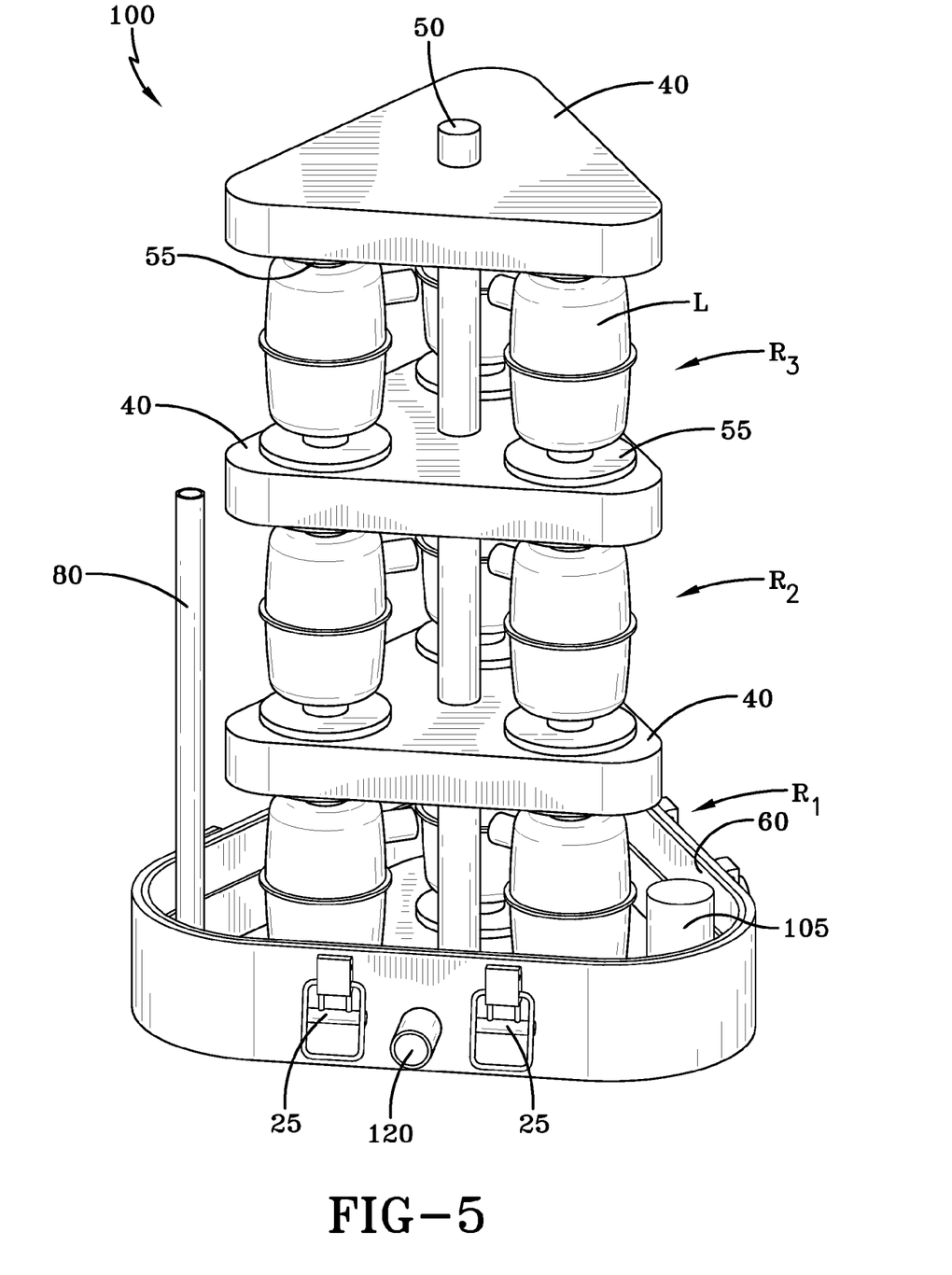
FIG. 5 shows the device of FIG. 4 with a cover removed such that a number of load cells to be compensated are revealed.

Another exemplary embodiment of a temperature compensation testing device 100 is illustrated in FIGS. 4-5. As shown, this temperature compensation testing device 100 is very similar to the temperature compensation testing device 5 depicted in FIGS. 1-3. However, unlike the temperature compensation testing device 5, which relies on an external temperature control device for regulating the temperature of the heat transfer fluid, this embodiment of the temperature compensation testing device 100 includes an internal temperature control device 105 that is housed within the vessel 110. The internal temperature control device 105 may be located within the vessel so as to circulate and control the temperature of the fluid therein, such as by means of the vertically extending conduit(s) 80.

One or more supply/drain ports 120 may be provided for initially supplying heat transfer fluid to the vessel 110 and subsequently draining heat transfer fluid from the vessel. Such drain ports 120 may be located in the base portion 115 of the vessel 110, as shown, but may be located elsewhere instead/as well.

Aside from the addition of a temperature control device 105, this embodiment of the temperature compensation testing device 100 may be substantially similar to the temperature compensation testing device 5 of FIGS. 1-3. For example, this temperature compensation testing device 100 may include the same support member 50, support plates 40 and load cell receivers 55 as the former temperature compensation testing device 5. The load cells L may also be supported within the vessel 110 of the temperature compensation testing device 100 in the same manner as described above, and the device may be installed to a load application device 65 and the load cells L tested as described above. Of course, as with the temperature compensation testing device 5, this embodiment of the temperature compensation testing device 100 may also be of other designs.

Figure 6A:
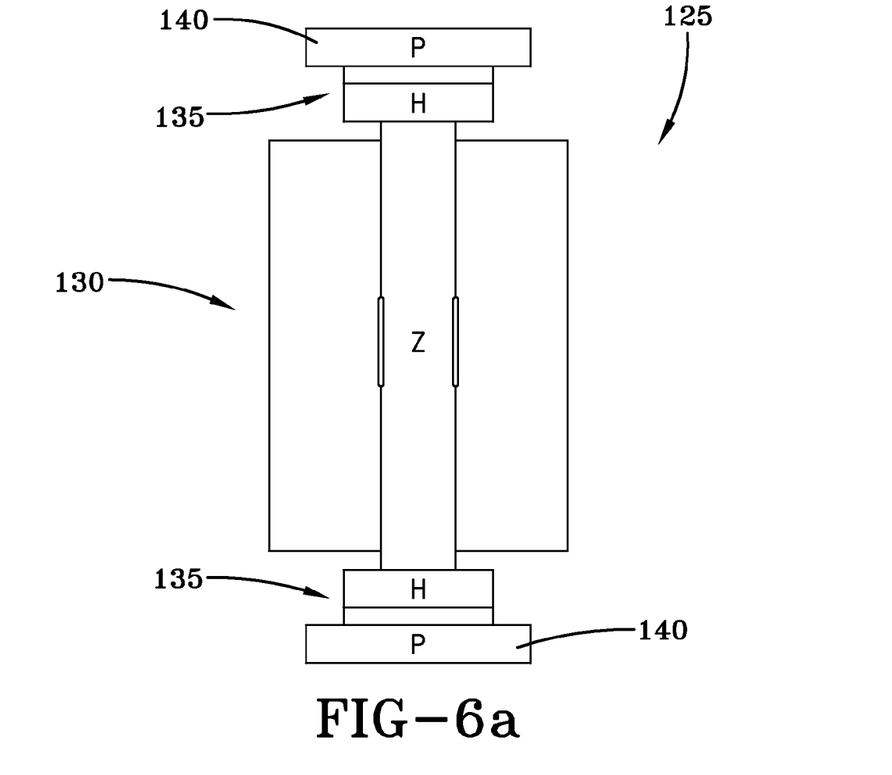
FIGS. 6a and the enlarged view of 6b schematically illustrate an exemplary embodiment of a heat transfer solid-employing temperature compensation testing device of the present invention in an assembled state.
Figure 6B:
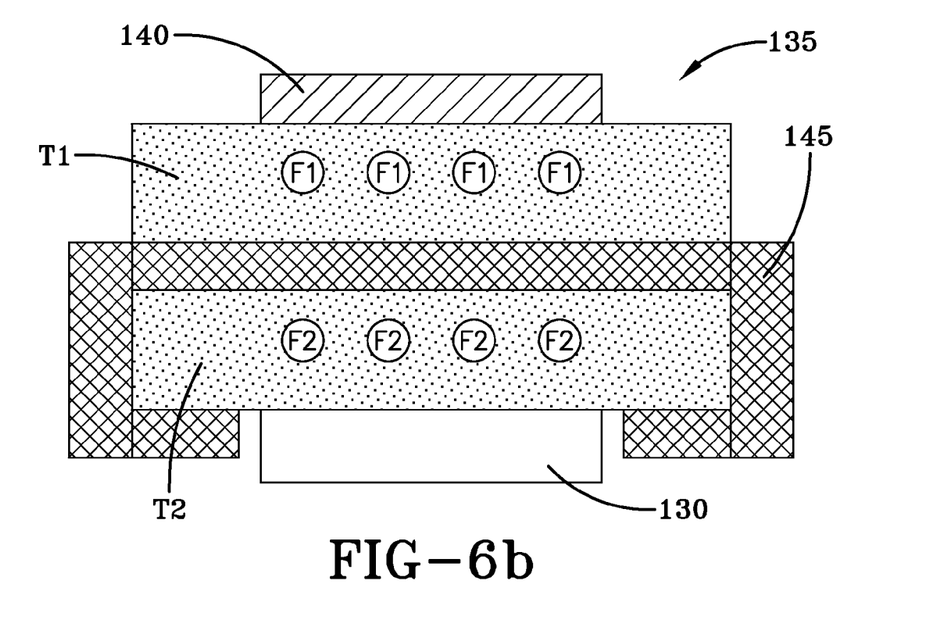
Figure 7:
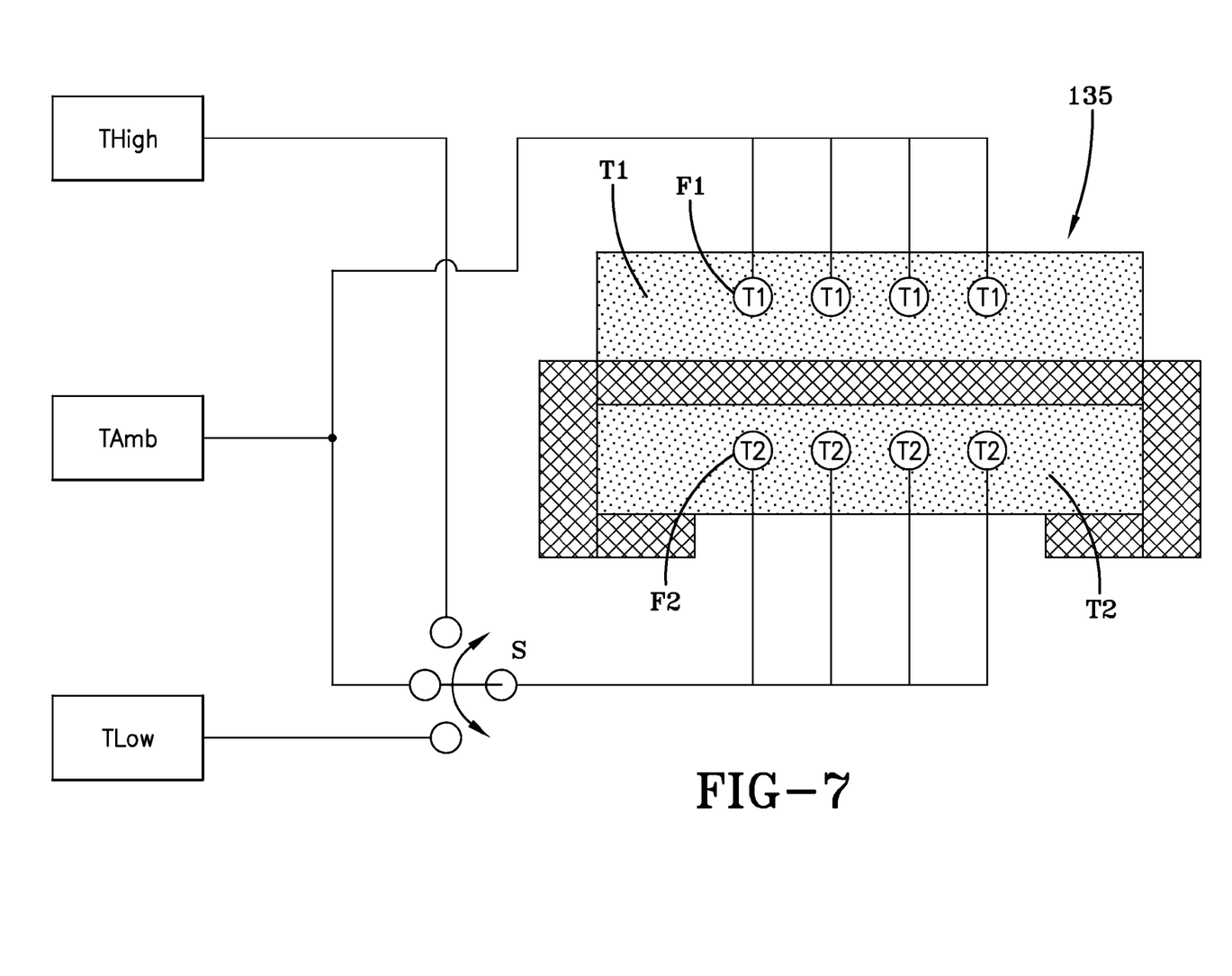
FIG. 7 is a schematic diagram showing fluid flow between a solid heat transfer element of FIGS. 6a-6b and various sources of heating/cooling fluid.

Yet another exemplary embodiment of a temperature compensation testing device of the present invention is depicted in FIGS. 6a-6b and 7. While similar to the temperature compensation testing devices 5, 100 shown in FIGS. 1-5 and described above, this embodiment of the temperature compensation testing device 125 accomplishes conductive heat transfer by contacting a load cell 130 with a solid heat transfer element(s) 135 and, therefore, eliminates the need for a containment vessel.

FIG. 6a illustrates a load cell 130 positioned between an upper and lower heat transfer element 135 within a press 140. Although for simplicity, FIGS. 6-7 schematically represent the heat transfer elements as being located directly between a load cell(s) and a press, it should be realized that the same arrangement or an arrangement similar to that shown in FIGS. 1-5 could also be employed in this embodiment.

As can be seen in the enlarged view of FIG. 6b, the heat transfer element 135 of this embodiment is divided into two temperature zones $T_1$, $T_2$ that are preferably separated by an insulator 145. Each temperature zone includes a plurality of corresponding flow passages $F_1$, $F_2$ through which a temperature controlled fluid may be passed.

It can be appreciated from a review of FIG. 6a that the heat transfer element 135 depicted in FIG. 6b is oriented for placement at an upper end of the load cell 130. It should also be understood that the heat transfer element 135 located at the bottom end of the load cell 130 resides in a reverse orientation. As such, the first temperature zone $T_1$ of each heat transfer element 135 resides between the insulator 145 thereof and the press 140. Similarly, a second temperature zone $T_2$ of each heat transfer element 135 resides between the insulator 145 thereof and the load cell 130.

Referring now to the schematic plumbing diagram of FIG. 7, it can be understood that the first temperature zone $T_1$ of each heat transfer element 135 is placed in communication with a source of pressurized fluid that is maintained at or near ambient temperature. The second temperature zone $T_2$ of each heat transfer element 135 is preferably switchable between sources of pressurized fluid that are maintained at different temperatures. For example, FIG. 7 depicts a system where the second temperature zone $T_2$ of the heat transfer element 135 is switchable between three different sources of pressurized fluid, each of which is maintained at a different temperature. In this manner, fluid at ambient temperature $T_{Amb}$, lower than ambient temperature $T_{Low}$ or above ambient temperature $T_{High}$ may be passed through the second temperature zone of a heat transfer element 135. This allows for the conductive heating or cooling of an associated load cell 130 as can be understood by reference to FIG. 6a, and for temperature compensation testing at any of various load cell temperatures. Further, by maintaining the temperature of the first temperature zone of each heat transfer element 135 at ambient temperature and by employing an insulator, it can be ensured that the desired testing temperature will not be affected by heat transfer from the press 140 or other structures. Such a design minimizes energy consumption and allows for a very short temperature stabilization time.

Figure 8:
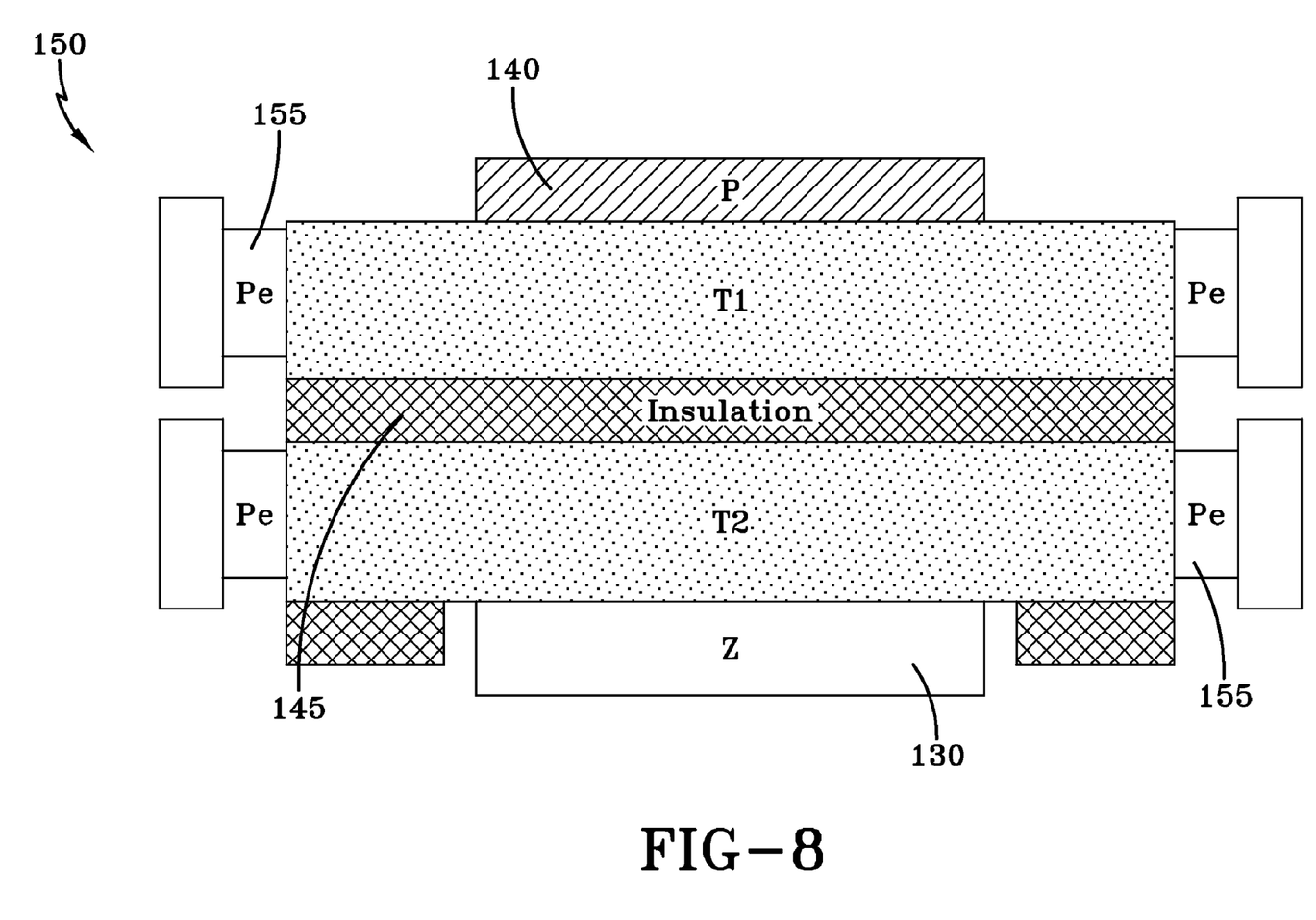
FIG. 8 represents an alternative version of the device of FIGS. 6-7.

An alternative version 150 of the heat transfer element 135 of FIGS. 6-7 is illustrated in FIG. 8. This device 150 operates in a manner similar to that described above with respect to the device 135 of FIGS. 6-7. However, instead of regulating the temperature of each of the first and second heat transfer element temperature zones $T_1$, $T_2$ by passing fluid therethrough, the first and second temperature zones $T_1$, $T_2$ of this heat transfer element 150 are controlled via Peltier elements 155 or similar devices. As would be understood by one of skill in the art, a Peltier element is an element in which the direction of heat transfer can be controlled. Thus, Peltier elements can be used with heat transfer elements to heat or cool an associated load cell in a manner similar to that described above with respect to the fluid controlled embodiment 125 of FIGS. 6-7.

Although not shown herein, it should be apparent that an assembled temperature compensation testing device could also be installed to an appropriate load application device in a substantially horizontal orientation, and such is considered to be within the scope of the present invention. It should also be apparent to one of skill in the art that the scope of the present invention allows for other changes to the exemplary embodiments described and shown herein. Therefore, while certain embodiments of the present invention are described in detail above, the scope of the invention is not to be considered limited by such disclosure, and modifications are possible without departing from the spirit of the invention as evidenced by the following claims:

What is claimed is:

1. A device for use in the temperature compensation testing of at least one digital load cell, comprising:
    a fluid-tight vessel for housing at least one digital load cell;
    a load cell receiver located in a base portion of said vessel and adapted to receive and releasably retain one end of said at least one digital load cell;
    at least one support plate located in said vessel and adapted to receive and releasably retain an opposite end of said at least one digital load cell;
    a fluid path for allowing the circulation of a temperature controlled fluid within said vessel; and
    an electronic communication path through a wall of said vessel for allowing communications between said at least one digital load cell and a device adapted to receive readings from said at least one digital load cell during testing;

wherein said vessel containing said at least one digital load cell is adapted for placement in a load application device that applies a load to said at least one digital load cell during testing.

2. The device of claim 1, wherein said vessel is adapted to house a number of digital load cells, said digital load cells arranged in stacked rows with a support plate interposed between each row.

3. The device of claim 2, further comprising one or more load cell receivers associated with each support plate, the number of load cell receivers present on a given side of each support plate corresponding to the number of digital load cells present in an associated row.

4. The device of claim 1, further comprising a support member passing substantially perpendicularly though each support plate.

5. The device of claim 1, wherein said support plates are substantially triangular in shape.

6. The device of claim 1, wherein an uppermost support plate is exposed through a top portion of said vessel so as to be contactable by a portion of a load application device.

7. The device of claim 1, wherein the temperature of said fluid that is circulated within said vessel is controlled by a temperature control device that resides within said vessel.

8. The device of claim 7, further comprising a circulation device for circulating fluid within said vessel.

9. The device of claim 1, wherein the temperature of said fluid that is circulated within said vessel is controlled by an external temperature control device that is connected to said vessel by one or more fluid ports and in communication with a pressurized source of said fluid.

10. The device of claim 1, wherein said fluid path includes at least one fluid conduit in said vessel for circulating temperature controlled fluid therein, said fluid conduit extending from near said base portion toward said at least one support plate.

11. The device of claim 1, wherein said device adapted to receive readings from said at least one digital load cell during testing is a host computer.

12. A device for use in the temperature compensation testing of a digital load cell, comprising:
a vessel for housing at least one digital load cell, said vessel having a base portion and a cover portion designed to mate with and seal to said base portion;
a load cell receiver located in said base portion and adapted to receive and releasably retain one end of said at least one digital load cell;
a support member extending substantially perpendicularly from said base portion;
at least one support plate located in said vessel and adapted to pass over said support member and to support an opposite end of said at least one digital load cell;
a load cell receiver located on said at least one support plate and adapted to receive and releasably retain said opposite end of said at least one digital load cell;
at least one fluid conduit in said vessel for circulating temperature controlled fluid therein, said fluid conduit extending from near said base portion toward said at least one support plate; and
a device in communication with said at least one digital load cell and adapted to receive readings from said at least one digital load cell during testing;
wherein said vessel containing said at least one digital load cell is adapted for placement in a load application device that applies a load to said at least one digital load cell via said at least one support plate during testing while temperature controlled fluid is circulated through said vessel to establish and stabilize the temperature of said at least one digital load cell.

13. The device of claim 12, wherein said vessel is adapted to house a number of digital load cells, said digital load cells arranged in stacked rows with a support plate interposed between each row.

14. The device of claim 12, wherein said support plates are substantially triangular in shape.

15. The device of claim 12, wherein an uppermost support plate is exposed through a top portion of said vessel so as to be contactable by a portion of a load application device.

16. The device of claim 12, wherein the temperature of said fluid that is circulated within said vessel is controlled by a temperature control device that resides within said vessel.

17. The device of claim 16, further comprising a pump for circulating fluid within said vessel.

18. The device of claim 12, wherein the temperature of said fluid that is circulated within said vessel is controlled by an external temperature control device that is connected to said vessel by one or more fluid ports and in communication with a pressurized source of said fluid.

19. A method of performing temperature compensation testing on at least one digital load cell, comprising:
providing a testing device, said testing device further comprising:
a fluid-tight vessel for housing at least one digital load cell,
a load cell receiver located in a base portion of said vessel and adapted to receive and releasably retain one end of said at least one digital load cell,
at least one support plate located in said vessel and adapted to receive and releasably retain an opposite end of said at least one digital load cell,
a fluid path for allowing the circulation of a temperature controlled fluid within said vessel, and
an electronic communication path through a wall of said vessel,
locating at least one digital load cell in said vessel and between an associated pair of load cell receivers;
sealing said vessel;
placing said vessel containing at least one digital load cell into a load application device;
connecting, through said electronic communication path, said at least one digital load cell to a device adapted to receive readings from said at least one digital load cell during testing;
providing said vessel with an amount of temperature controlled fluid;
circulating said fluid within said vessel so as to maintain said at least one digital load cell at a desired temperature;
using said application device to apply a load to said at least one digital load cell; and
receiving readings from said at least one digital load cell for use in developing one or more temperature compensation factors for said at least one digital load cell.

20. The method of claim 19, wherein a plurality of digital load cells are simultaneously arranged in said vessel, said digital load cells arranged in stacked rows with a support plate interposed between each row.

21. The method of claim 20, wherein a single load cell from each of said rows operates to report the load on all the load cells in its row.

22. The method of claim 19, further comprising providing a cooperating pair of load cell receivers for supporting each digital load cell placed in said vessel.

* * * * *